United States Patent

Murayama et al.

[15] 3,692,778
[45] Sept. 19, 1972

[54] PIPERIDINE-SPIRO-OXIRANE DERIVATIVES

[72] Inventors: Keisuke Murayama; Syoji Morimura; Takao Yoshioka; Katsuaki Matsui; Tomoyuki Kurumada; Noriyuki Ohta; Ichiro Watanabe, all of Tokyo, Japan

[73] Assignee: Sankyo Company Limited

[22] Filed: Aug. 26, 1970

[21] Appl. No.: 67,246

[30] Foreign Application Priority Data

Sept. 2, 1969    Japan ..................44/69451
Aug. 15, 1970    Japan ..................45/71092

[52] U.S. Cl......260/293.66, 260/45.8 NZ, 260/37 R, 252/380
[51] Int. Cl. ...............................C07d 99/04
[58] Field of Search..................260/293.66

[56] References Cited

OTHER PUBLICATIONS

Golubev et al., Izv. Akad. Nauk SSSR, Ser. Khim. 1966 (2), 343– 345.
Omodt et al., J. Am. Pharm. Assoc. 49, 153– 158 (1960); Chem. Abstracts 54:16748i.

*Primary Examiner*—John D. Randolph
*Assistant Examiner*—G. Thomas Todd
*Attorney*—McGlew and Toren

[57] ABSTRACT

New piperidine-spiro-oxirane derivatives having the formula

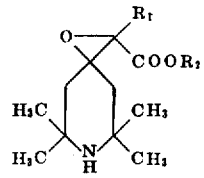

wherein $R_1$ represents hydrogen atom or an alkyl group of one to four carbon atoms and $R_2$ represents an alkyl group of one to eight carbon atoms. These piperidine-spiro-oxirane derivatives are prepared by reacting triacetonamine with a halogenated aliphatic carboxylic acid ester having the formula

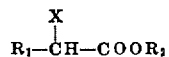

wherein $R_1$ and $R_2$ are as defined above and X represents a halogen atom in the presence of a base capable of producing carbanion. The present piperidine-spiro-oxirane derivatives show a superior stabilizing activity against photo- and thermo-deterioration of various synthetic polymers, e.g., including polyolefins, polyvinyl chlorides, polyvinylidene chlorides, polyacetals, polyesters, polyamides and polyurethanes and thus they are useful as a stabilizer for preventing said deterioration.

4 Claims, No Drawings

PIPERIDINE-SPIRO-OXIRANE DERIVATIVES

This invention relates to a new class of piperidine-spiro-oxirane derivatives, a process for the preparation thereof, as well as their use as a stabilizer for the stabilization of synthetic polymers.

More particularly, it is concerned with a piperidine-spiro-oxirane derivative having the formula

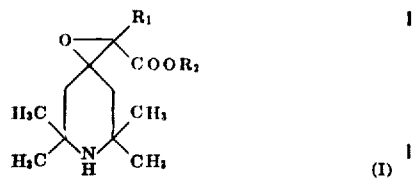

wherein $R_1$ represents hydrogen atom or an alkyl group of one to four carbon atoms and $R_2$ represents an alkyl group of one to eight carbon atoms and a process for the preparation of the piperidine-spiro-oxirane derivative having the above Formula (I). It is also concerned with the stabilization of synthetic polymers against photo- and thermo-deterioration thereof by having incorporated therein, in a sufficient amount to prevent such deterioration, the piperidine-spiro-oxirane derivative having the above Formula (I).

In the above Formula (I), the group $R_1$ may be exemplified by hydrogen, methyl, ethyl, n-propyl, isopropyl and n-butyl and the group $R_2$ may be exemplified by methyl, ethyl, n-propyl, isopropyl, n-butyl, pentyl and n-octyl.

The term "synthetic polymer" as used herein are intended to embrace
polyolefins
  including homopolymers of olefins such as low-density polyethylene, high-density polyethylene, polypropylene, polystyrene, polybutadiene, polyisoprene and the like, and copolymers of olefins with other ethylenically unsaturated monomers such as ethylene-propylene copolymer, ethylene-butene copolymer, ethylene-vinyl acetate copolymer, styrene-butadiene copolymer, acrylonitrile-styrene-butadiene copolymer and the like;
polyvinyl chlorides and polyvinylidene chlorides
  including homopolymer of each of vinyl chloride and vinylidene chloride, vinyl chloride-vinylidene chloride copolymer and copolymers of each of vinyl chloride and vinylidene chloride with vinyl acetate or other ethylenically unsaturated monomers;
polyesters;
polyacetals;
polyamides; and
polyurethanes.

The piperidine-spiro-oxirane derivatives (I) of this invention are all new substances undisclosed in the prior art. They exhibit a high degree of stabilizing action on the synthetic polymer, e.g., polyolefins, polyvinyl chloride, polyvinylidene chloride, polyesters, polyamides and polyurethanes against the deteriorations thereof.

It is, accordingly, an object of this invention to provide the new and valuable piperidine-spiro-oxirane derivatives of the above Formula (I).

It is another object of this invention to provide a process for the preparation of such useful piperidine-spiro-oxirane derivatives of the above Formula (I).

Still another object of this invention is to provide photo- and thermo-deterioration thereof wherein there is incorporated the piperidine-spiro-oxirane derivatives of the above Formula (I).

These and other objects of this invention will be apparent to those skilled in the art from the following detailed disclosure of this invention.

According to this invention, the piperidine-spiro-oxirane derivatives of the above Formula (I) can be produced by a process which comprises reacting triacetonamine represented by the formula

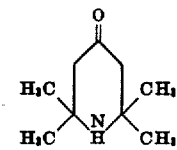

with an ester of a halogenated aliphatic carboxylic acid having the formula

wherein $R_1$ and $R_2$ are as defined above and X represents a halogen atom in the presence of a base capable of producing carbanion.

Representative examples of the piperidine-spiro-oxirane derivatives of the above Formula (I) are illustratively listed hereinbelow. It is, however, to be understood that this invention is not limited to those compounds.

1. 1-Oxa-2-methoxycarbonyl-6-aza-5,5,7,7-tetramethyl-spiro [2.5]octane;
2. 1-oxa-2-ethoxycarbonyl-6-aza-5,5,7,7-tetramethyl-spiro [2.5]octane;
3. 1-oxa-2-n-octyloxycarbonyl-6-aza-5,5,7,7-tetramethyl-spiro [2.5] octane;
4. 1-oxa-2-methyl-2-ethoxycarbonyl-6-aza-5,5,7,7-tetramethyl-spiro [2.5]octane; and
5. 1-oxa-2-ethyl-2-methoxycarbonyl-6-aza-5,5,7,7-tetramethyl-spiro [2.5]octane.

The salts of the piperidine-spiro-oxirane derivatives (I) are also contemplated to be included within the scope of this invention. Examples of suitable salts of the piperidine-spiro-oxirane derivatives which may be employed in this invention include inorganic acid salts, e.g., phosphate and the like; as well as organic acid salts, e.g., citrate, stearate, benzoate and the like.

The reaction in the process of this invention follows Darzens' condensation reaction and may be suitably effected in the presence of a base capable of producing carbanion in an organic solvent. Suitable examples of the bases which are capable of producing carbanion in the present reaction include alkali metal alcoholates, e.g., sodium methylate or ethylate; alkali metal hydrides, e.g., sodium hydride; alkali metal amides, e.g., sodium amide; and the like. Suitable examples of the organic solvents to be employed include aliphatic alcohols, e.g., methanol or ethanol; aromatic hydrocarbons, e.g., benzene, toluene or xylene; and the like. The reaction temperature and period are not critical in this invention, but the reaction may be usually conducted at room temperature for about 10–30 hours. Other reaction conditions and procedures than the foregoing may be those commonly employed in the art for Darzens' condensation reaction.

In one of the preferred embodiments of this reaction, a suspension or solution of the base in the above-mentioned organic solvent is first cooled to about −10° to −20° C. and then equimolar amounts of the triacetonamine and of the halogenated aliphatic carboxylic acid ester (II) to said base are added dropwise thereto with stirring. After completion of the dropwise-addition, the resulting mixture is stirred at room temperature for about 10–30 hours to ensure completion of the reaction.

After completion of the reaction, the reaction product may be readily recovered and purified from the reaction mixture by a conventional method. For example, the reaction mixture is made acidic by addition of a suitable acid, e.g., glacial acetic acid, the acid mixture concentrated, the concentrate made alkaline by addition of a suitable alkali, e.g., potassium carbonate and extracted with an organic solvent, e.g., ether or benzene and then the extract can be subjected to distillation under reduced pressure to give the desired product (I).

According to the another aspect of this invention, as explained above, there is also provided a synthetic polymer composition stabilized against photo- and thermo-deterioration thereof wherein there is incorporated, in a sufficient amount to prevent said deterioration, one or more of the piperidine-spiro-oxirane derivatives (I) of this invention.

Where the piperidine-spiro-oxirane derivatives of the above formula (I) are to be employed in the synthetic polymer for the purpose of stabilization, they may be readily incorporated into such polymers by various standard procedures commonly utilized in the art. The stabilizing piperidine-spiro-oxirane derivatives (I) of this invention may be incorporated into the synthetic polymers at any desired stage prior to the manufacture of shaped articles therefrom. For example, the stabilizer in a form of powder may be admixed with the synthetic polymer or a solution, suspension or emulsion of such a stabilizer may be admixed with a solution, suspension of emulsion of the polymer of this invention.

The amount of the piperidine-spiro-oxirane derivative to be employed in the synthetic polymer in accordance with this invention may be widely varied, depending upon mainly the types, properties and particular use of the polymer to be stabilized.

In general, the piperidine-sprio-oxirane derivatives of the Formula (I) may be added in an amount ranging from 0.01 to 5.0 percent by weight, based on the amount of the synthetic polymer, but the practical range is varied depending upon the type of the particular synthetic polymer, that is 0.01 to 2.0 percent by weight, preferably 0.02 to 1.0 percent by weight for polyolefins, 0.01 to 2.0 percent by weight, preferably 0.02 to 1.0 percent by weight for polyvinyl chloride and polyvinylidene chloride, 0.01 to 5.0 percent by weight, preferably 0.02 to 2.0 percent by weight for polyurethanes and polyamides, and 0.01 to 2.0 percent by weight, preferably 0.05 to 1 percent by weight for polyesters and polyacetals.

The present stabilizers may be used alone or in combination with other known stabilizers, fillers, pigments and the like.

If desired, two or more of the present stabilizers i.e., the piperidine-spiro-oxirane derivatives of the Formula (I) or the salt thereof may also be satisfactorily used in admixture.

In order that this invention may be better understood, the following Examples are given solely for the purpose of illustration. In these Examples, all parts and percentages are given by weight unless otherwise stated.

Examples 1 and 2 describe the preparation of some of the piperidine-spiro-oxirane derivatives (I) of this invention.

Examples 3 through 8 describe some of the stabilized synthetic polymer compositions which contain as a stabilizer the piperidine-spiro-oxirane derivatives (I) of this invention.

EXAMPLE 1

1-Oxa-2-ethoxycarbonyl-6-aza-5,5,7,7-tetramethyl-spiro[2.5]octane

A sodium ethoxide solution in ethanol was prepared from 10.6 g. of metallic sodium and 240 ml. of ethanol and cooled to −10° C. To the solution were added dropwise with stirring 46.5 g. of triacetonamine and then 55 g. of ethyl monochloroacetate. After completion of the dropwise-addition, the mixture was stirred at room temperature for 15 hours. Then, the reaction mixture was made acidic by addition of 9 ml. of glacial acetic acid and concentrated. - residue was made alkaline by addition of an aqueous sodium carbonate solution and the whole mixture was extracted with ether. The ether extract was dried over potassium carbonate, the solvent was distilled off and the residue was subjected to distillation under reduced pressure to give the desired product as colorless oily substance having a boiling point of 91°–95° C./0.03 mmHg.

Analysis for $C_{13}H_{23}NO_3$:
Calculated: C, 64.70%; H, 9.61%; N, 5.80%.
Found : C, 64.91%; H, 9.78%; N, 5.63%,
I.R. spectrum (liquid film):

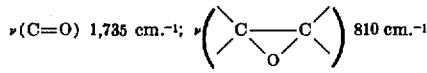

$\nu(C=O)$ 1,735 cm.$^{-1}$; $\nu$ 810 cm.$^{-1}$

EXAMPLE 2. 1-Oxa-2-methyl-2-ethoxycarbonyl-6-aza-5,5,7,7-tetramethyl-spiro[2.5]octane Into a solution of sodium ethoxide in ethanol prepared from 2.2 g. of metallic sodium and 50 ml. of ethanol were added dropwise, with stirring under nitrogen stream at −10° to −15° C., 10 g. of triacetonamine and then 13 g. of ethyl α-chloropropionate. After completion of the dropwise-addition, the resulting mixture was stirred at room temperature for 12 hours. Then, the reaction mixture was cooled to 0°– 5° C., made acidic by addition of 5.75 g. of glacial acetic acid and then concentrated. The residue was made alkaline by addition of an aqueous sodium carbonate solution and the whole mixture was extracted with ether. The extract was dried over anhydrous sodium sulfate, the solvent was distilled off and then the residue was subjected to distillation under reduced pressure to give the desired product as colorless oily substance having a boiling point of 106°–108° C./3 mmHg.

Analysis for $C_{14}H_{25}NO_3$:
Calculated: C, 65.90%; H, 9.80%; N, 5.49%.
Found: C, 65.97%; H, 10.10%; N, 5.15%.
I.R. spectrum (liquid film):
$\gamma(c=o)$ 1750 cm$^{-1}$; $\gamma(NH)$ 3350 cm$^{-1}$
Mass spectrum:
Molecular weight (Calculated), 255
Molecular ion peak, 255
Fragment peak, $M^+-15$ ($-CH_3$);

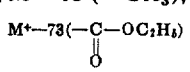

EXAMPLE 3

Into 100 parts of polypropylene [Noblen JHH–G, trade name, available from Mitsui Toatsu Chemicals Inc., Japan, employed after twice recrystallizations from monochlorobenzene] was incorporated 0.25 part of each of the test compounds of this invention indicated below. The resulting mixture was mixed and melted and then molded into a sheet having a thickness of 0.5 mm. under heating and pressure.

As a control, the polypropylene sheet was prepared in a similar manner to that described above without any of stabilizers for comparative purpose.

Then, all of these sheets thus formed were tested for the brittleness time (which means the time, expressed in terms of hour, until the test sheet will become brittle) under ultraviolet irradiation at a temperature of 45° C. by means of the fade meter prescribed in Japanese Industrial Standard JIS–1044 entitled "Testing Method of Color Fastness to Light of Dyed Textiles and Dyestuffs," Paragraph 3.8 (in English).

The results are given in the following Table 1.

TABLE 1

| Test compound No.* | Brittleness time (hours) |
|---|---|
| 2 | 960 |
| 3 | 1100 |
| 4 | 920 |
| none | 100 |

* The number of the test compound is the same as specified hereinabove.

EXAMPLE 4

Into 100 parts of high-density polyethylene [Hi-Zex, trade name, available from Mitsui Toatsu Chemicals Inc., Japan, employed after twice recrystallization from toluene] were incorporated 0.1 part of each of the test compounds of this invention indicated below. The resulting mixture was made into a sheet by the same procedure as in the above Example 3.

The sheet thus formed was tested for the brittleness time by the same test method as in the above Example 3. The results are given in the following Table 2.

TABLE 2.

| Test compound No.* | Brittleness time (hour) |
|---|---|
| 2 | 1600 |
| 3 | 1980 |
| 4 | 1440 |
| None | 400 |

* The number of the test compound is the same as specified hereinabove.

EXAMPLE 5

Into 100 parts of 6-nylon [CM 1011, trade name, available from Toyo Rayon Co. Ltd., Japan, containing no stabilizer] was incorporated 0.25 part of each of the test compounds of this invention indicated below. The resulting mixture was heated and melted and then molded into a film having a thickness of about 0.1 mm. under pressure. The film thus formed was aged under the following aging condition and thereafter subjected to a tensile test to determine the retentions of ultimate tensile strength and ultimate elongation.

Aging test
1. Exposure to ultraviolet ray for 300 hours in the fade meter described above at 45° C.
2. Aging at 160° C. for 2 hours in a Geer's aging tester prescribed in Japanese Industrial Standard JIS–K–6301 entitled "Physical Testing Methods for Vulcanized Rubber," Paragraph 6.5 (in English). The results are summarized in the following Table 3.

TABLE 3.

| Test Compound No.* | Fade meter 300 hours | | Geer's tester 160°C, 2 hours | |
|---|---|---|---|---|
| | Retention of ultimate elongation (%) | Retention of ultimate tensile strength (%) | Retention of ultimate elongation (%) | Retention of ultimate tensile strength (%) |
| 2 | 100 | 66 | 54 | 85 |
| 3 | 91 | 65 | 59 | 78 |
| 4 | 82 | 67 | 58 | 75 |
| none | 8 | 34 | 5 | 63 |

* The number of the test compound is the same as specified hereinabove.

EXAMPLE 6

Into 100 parts of polyurethane prepared from polycaprolactone [E–5080, trade name, available from The Nippon Elastollan Industries Ltd., Japan] was incorporated 0.5 part of each of the test compounds of this invention indicated below. The resulting mixture was heated and melted and then molded into a sheet having a thickness of about 0.5 mm. The sheet thus formed was subjected to the exposure to ultraviolet ray for 15 hours in the fade-meter as specified in the above Example 3 at 45° C. and then tested for the retentions of ultimate elongation and ultimate tensile strength as in the above Example 5.

The results are given in the following Table 4.

TABLE 4.

| Test compound No.* | Retention of ultimate elongation (%) | Retention of ultimate tensile strength (%) |
|---|---|---|
| 2 | 86 | 78 |
| 3 | 88 | 76 |
| 4 | 85 | 84 |
| none | 75 | 53 |

* The number of the test compound is the same as specified hereinabove.

EXAMPLE 7

Into 100 parts of polyvinyl chloride [Geon 103 EP, trade name, available from The Japanese Geon Co. Ltd., Japan] were incorporated 1.0 part of lead stearate, 0.5 part of dibasic lead phosphite, 0.5 part of barium stearate, 0.5 part of cadmium stearate and 0.2 part of each of the test compounds of this invention indicated below. The resulting mixture was blended and kneaded for 4 minutes on a kneading roll at 180° C. and formed into a sheet having a thickness of about 0.5 mm. The sheet was tested for the discoloration degree thereof by the aging test method set forth below.

Aging Test
1. Exposure to the sunshine carbon apparatus prescribed in Japanese Industrial Standard JIS Z-0230 entitled "Accelerated Weathering test of Rust Proofing Oils," Paragraph 2 for 600 hours.
2. The sheet was aged for 90 minutes at 170° C. in the Geer's aging tester prescribed in the above Example 5. The results are given in the following Table 5.

TABLE 5.

| Test compound No.* | Sunshine carbon 600 hours | Geer's tester 170°C 90 minutes |
|---|---|---|
| 2 | pale yellow | yellow |
| 3 | " | pale yellow |
| 4 | yellowish white | yellowish white |
| none | dark brown | black |

* The number of the test compound is the same as specified hereinabove.

EXAMPLE 8

Into 100 parts of polyvinyl chloride [Geon 103 EP, trade name, available from The Japanese Geon Co. Ltd., Japan] were incorporated 30 parts of acrylonitrile-butadiene-styrene copolymer [ABS 60, trade name, available from Japan Synthetic Rubber Co. Ltd., Japan] 3.0 part of tribasic lead sulfate, 2 parts of dibasic lead phosphite, 2 part of lead stearate, and 1 part of each of the test compounds of this invention indicated below. The resulting mixture was blended and kneaded for 8 minutes on a kneading roll at 180° C. and formed into a sheet having a thickness of about 0.5 mm. The sheet was exposed to the sunshine carbon apparatus as described in the above Example 7 for 60 hours. Then, the exposed sheet was tested for the retentions of ultimate tensile strength and ultimate elongation as in the above Example 5.

The results are given in the following Table 6.

TABLE 6.

| Test compound No. * | Retention of ultimate elongation (%) | Retention of ultimate tensile strength (%) |
|---|---|---|
| 2 | 59 | 90 |
| 3 | 65 | 85 |
| none | 41 | 82 |

* The number of the test compound is the same as specified hereinabove.

From the above results it can be seen that the piperidine-spiro-oxinane derivatives of this invention show a high degree of stabilizing effect on synthetic polymers against deteriorations.

What is claimed is:
1. A compound having the formula

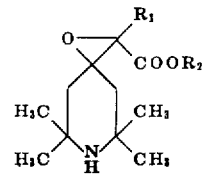

wherein $R_1$ represents hydrogen atom or an alkyl group of one to four carbon atoms and $R_2$ represents an alkyl group of one to eight carbon atoms.

2. 1-Oxa-2-methoxycarbonyl-6-aza-5,5,7,7-tetramethyl-spiro[2.5]octane.
3. 1-Oxa-2-ethoxycarbonyl-6-aza-5,5,7,7-tetramethyl/-spiro-[2.5]octane.
4. 1-Oxa-2-n-octyloxycarbonyl-6-aza-5,5,7,7-tetramethyl-spiro[2.5]octane.

* * * * *